US009280660B2

(12) United States Patent
Velammal et al.

(10) Patent No.: US 9,280,660 B2
(45) Date of Patent: Mar. 8, 2016

(54) MOBILE INFORMATION MANAGEMENT METHODS AND SYSTEMS

(71) Applicant: Cognizant Business Services Limited, Jersey (GB)

(72) Inventors: Parasu Pillai Iyappan Velammal, Tamil Nadu (IN); Narayn Sridharan, Tamil Nadu (IN); Mathangi Nageswar, Tamil Nadu (IN); HariPrashanth Ganapathy, Tamil Nadu (IN)

(73) Assignee: Cognizant Business Services Limited, Jersey (GB)

( * ) Notice: Subject to any disclaimer, the term of this patent is extended or adjusted under 35 U.S.C. 154(b) by 0 days.

(21) Appl. No.: 14/209,307

(22) Filed: Mar. 13, 2014

(65) Prior Publication Data
US 2014/0282853 A1 Sep. 18, 2014

(30) Foreign Application Priority Data

Mar. 15, 2013 (IN) .......................... 1115/CHE/2013

(51) Int. Cl.
*G06F 21/00* (2013.01)
*G06F 21/54* (2013.01)
(52) U.S. Cl.
CPC ........ *G06F 21/54* (2013.01); *G06F 2221/2111* (2013.01)
(58) Field of Classification Search
USPC ............................................................ 726/1
See application file for complete search history.

(56) References Cited

U.S. PATENT DOCUMENTS

| 6,708,225 | B1* | 3/2004 | Cho et al. ...................... 719/317 |
| 6,721,713 | B1* | 4/2004 | Guheen et al. ................. 705/1.1 |
| 6,920,567 | B1* | 7/2005 | Doherty et al. ................. 726/22 |
| 7,315,826 | B1* | 1/2008 | Guheen et al. ............... 705/7.29 |
| 7,991,159 | B2 | 8/2011 | Floyd |
| 8,060,074 | B2 | 11/2011 | Danford et al. |
| 2002/0169983 | A1 | 11/2002 | Rygaard |
| 2003/0009675 | A1 | 1/2003 | Rygaard |
| 2003/0037099 | A1 | 2/2003 | Rygaard |
| 2004/0001476 | A1 | 1/2004 | Islam et al. |
| 2007/0293202 | A1 | 12/2007 | Moshir et al. |
| 2008/0066150 | A1* | 3/2008 | Lim .................................. 726/1 |
| 2009/0024992 | A1 | 1/2009 | Kulaga et al. |
| 2010/0146269 | A1* | 6/2010 | Baskaran ...................... 713/165 |

(Continued)

OTHER PUBLICATIONS

Security and Management Policy Specification| https://spiral.imperial.ac.uk/bitstream/10044/1/4324/1/IEEEnetworkSuryey.pdf|Sloman et al.|2002|pp. 1-21.*

(Continued)

*Primary Examiner* — Mahfuzur Rahman
(74) *Attorney, Agent, or Firm* — Rothwell, Figg, Ernst & Manbeck, PC

(57) ABSTRACT

A system and method are disclosed for mobile information management using a code injection approach. The method for information management of applications includes the steps of: receiving, by a computer, one or more compiled applications, and receiving, by a computer, one or more security policies, wherein each security policy indicates one or more use cases and one or more security actions associated with each use case. The method also includes the step of associating the received applications with the one or more received security policies. Additionally, the method includes the step of automatically wrapping the received applications with the associated security policy using a code injection script.

18 Claims, 7 Drawing Sheets

(56) References Cited

U.S. PATENT DOCUMENTS

| | | | |
|---|---|---|---|
| 2010/0299152 A1 | 11/2010 | Batchu et al. | |
| 2010/0299376 A1 | 11/2010 | Batchu et al. | |
| 2010/0299719 A1 | 11/2010 | Burks et al. | |
| 2011/0151903 A1 | 6/2011 | Moshir et al. | |
| 2011/0167474 A1 | 7/2011 | Sinha et al. | |
| 2012/0015644 A1 | 1/2012 | Danford et al. | |
| 2012/0204255 A1 | 8/2012 | Park | |
| 2012/0246731 A1 | 9/2012 | Blaisdell et al. | |
| 2014/0325664 A1* | 10/2014 | Nekhoroshev | 726/26 |

OTHER PUBLICATIONS

International Search Report and Written Opinion issued in related application No. PCT/IB2014/001642 dated Nov. 12, 2014, 7 pages.

Sybase, Inc., Afaria: A Technical Overview, White Paper, 2011, pp. 2-7, Dublin, CA, USA.

Mobileiron, Inc., Docs@Work: Data Loss Prevention and Secure Access for Mobile Content, White Paper, 2012, pp. 1-5, Mountain View, CA, USA.

Zenprise, The Shift to MDM 2.0, A Zenprise White Paper, Nov. 2012, pp. 1-8, Redwood City, CA, USA.

* cited by examiner

MOBILE INFORMATION MANAGEMENT METHODS AND SYSTEMS

CROSS REFERENCE TO RELATED APPLICATIONS

This application claims priority under 35 U.S.C. §119 to India Patent Application No. 1115/CHE/2013 filed on Mar. 15, 2013, which is incorporated herein in its entirety.

TECHNICAL FIELD

The present invention relates to systems and methods for mobile information management using a code injection approach.

BACKGROUND

Companies are increasingly allowing employees to access sensitive corporate data on the employee's mobile device. Historically, security of such devices has revolved around device based security where security policies are downloaded to a device. A security agent will constantly scan the device for applications, and determine a security policy based on the applications loaded onto the device. This type of device based security was provided by mobile device management ("MDM") players like Afaria, MobileIron, and Zenprise, and was well-adapted for company procured mobile devices.

With increasingly popular "bring your own device" policies, employees are allowed to use their personal mobile devices to access sensitive corporate data. Such policies eliminate the need for employees to have a corporate device, in addition to their personal mobile device, in order to access sensitive corporate data. However, even with a bring your own device policy, companies still wish to protect sensitive corporate data. Unfortunately, device based security models do not distinguish between company data and personal data, and personal data may become locked up or lost along with enterprise data, depending on the device based security policies. Consequently, with the proliferation of employee owned devices through "bring your own device" policies, there is a need to separate personal data from corporate data in order to apply appropriate mobile device security settings.

There are some solutions that address the need to separate personal data from enterprise data when securing an employee's mobile device. These solutions may provide application based security, wherein applications are embedded at compilation time with a security wrapper that decides the security policies for the application. Such solutions are referred to as Mobile Application Management ("MAM"). However, the MAM approach requires a developer to use a proprietary software development kit ("SDK") or library to compile the application in order to ensure that the security wrapper and policy are built into the application at run time. Many organizations have difficulties with this MAM approach because it ties them to a particular vendor associated with the proprietary SDK or library. Additionally, every time the security wrapper needs to be updated with additional or modified security policies, the application will need to be recompiled.

Accordingly, there exists a need to build security during application upload that obviates the need for either a proprietary wrapper or a library, and is thereby vendor independent.

SUMMARY

A system and method are disclosed for mobile information management using a code injection approach that overcomes the limitations described above.

The method for information management of applications includes the step of receiving, by a computer, one or more compiled applications. The method further includes the step of receiving, by a computer, one or more security policies, wherein each security policy indicates one or more use cases and one or more security actions associated with each use case. The method further includes the step of associating the received applications with the one or more received security policies. Additionally, the method includes the step of automatically wrapping the received applications with the associated security policy using a code injection script.

The application information management security system includes a governance console configured to store one or more security policies. Each security policy corresponds to one or more applications intended for one or more computing devices. Additionally, each security policy indicates one or more potential use cases and one or more corresponding security actions. The system also includes a security console. The security console is configured to receive compiled applications. The security console is also configured to automatically wrap each of the received compiled applications with one or more security policies using a code injection script.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
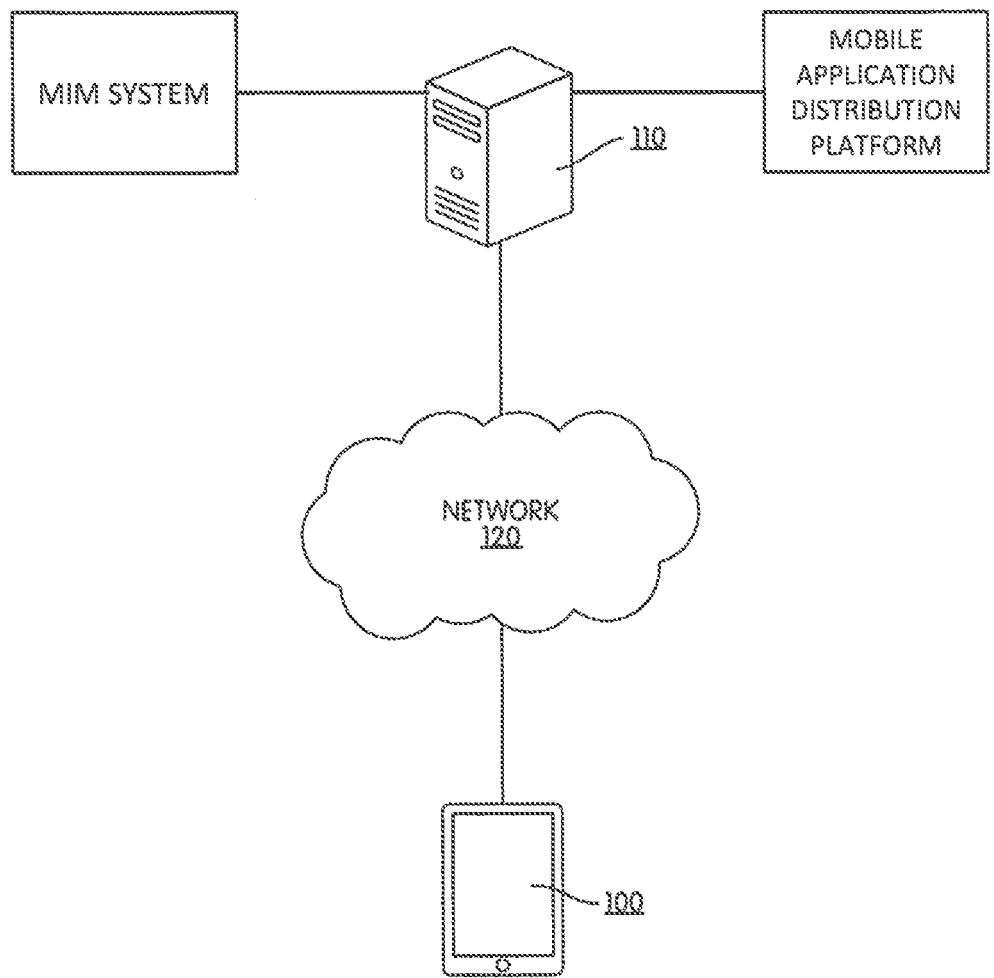
FIG. 1 is a schematic diagram illustrating the hardware environment of a mobile information management system embodying aspects of the invention.

A code injection approach to mobile information management ("MIM") is used in a middleware system to wrap a security policy around an application. In exemplary embodiments, a MIM code injection based platform may offer several key advantages. For example, MIM code injection componentizes device security, and absolves application developers of concerns relevant to application security and authorization. MIM code injection provides for individualized application based security, as opposed to centralized device monitoring that is offered by traditional MDM solutions. Additionally, MIM code injection allows organizations to use an SDK independent approach to wrap security policies around applications. As a result, organizations do not need to be tied to a particular vendor for device security. Furthermore, with the MIM code injection approach, when a security wrapper is updated with additional security policies, there is no need to recompile the application with a new security wrapper.

In some embodiments, the disclosed systems and methods may provide several key components to MIM, such as, for example, content management components, policy administration components, accessibility components, and security components.

Content management components may include: support for industry domain models, offline data permissions, and security permissions for content. For example, an offline data permission may dictate whether a user can access particular content in offline mode, and security permissions may specify access restrictions to certain content.

Policy administration components may provide: security policies at the application level, update policies, multiple policies for a single application, alerts and notifications, and deletion of enterprise content on lost or stolen devices. For example, some security options may restrict access to an application based on time, geographic location, and/or jailbroken status of the device. Other security options may prevent the cut, copy, and/or paste commands at an application level. Additionally, one security option may set an offline access duration and/or an idle timeout threshold. Any combination of one or more security options, such as the ones listed above, may be chosen to form a security policy.

Accessibility components may include time based access restriction and location based access restriction. Additionally, security components may include data encryption, jail break/rooted device detection, remote data wiping, time bound data deletion, local storage write policies, and phone feature access controls.

In exemplary embodiments, the disclosed MIM systems and methods provide developers the flexibility to develop applications in any mobile platform, such as Android, iOS, HTML5, and other cross-platform solutions. Additionally, the MIM systems and methods may change the mobile application's behavior at run time, thereby allowing enterprises to specify the behavior of an application and have full control of screens and navigations. Furthermore, the behavior of applications may be changed according to specific user roles defined by web services. In some embodiments, security policies are dynamic, and may be modified without the need to re-wrap and compile an updated security policy.

According to various embodiments, a middleware MIM system may provide facilities for managing application security that overcomes the limitations of prior art systems. According to some embodiments, the MIM system may include a governance console with an admin portal for setting, managing, monitoring, and viewing security policies deployed for multiple applications across users and/or groups. The governance console may thus provide a single interface for managing MIM policies across applications, users, and/or groups. Such policies may include admin-specified rules, which may include one or more actions to take in response to use cases and/or one or more conditions detected at run time.

The middleware MIM system may include a backend application security console for implementing the MIM policies defined at the governance console. For example, the application security console may monitor run time conditions of mobile devices, via virtual machines injected into mobile applications, to detect relevant events. Relevant events may include use cases, which include aspects relating to the use of a mobile or other computing device, such as application(s) being executed, functionalities being employed, location of the device, time of use of the device, receipt of appropriate security credentials (password, security tags, etc.), or any combination of any or all of these aspects. In response to detecting an event, the application security console may compare the event to the admin-specified security policies and take appropriate actions if the event matches a specified number of conditions specified in one or more of the policies. Additionally, the application security console may automatically deploy new security policies at a mobile device in response to, for example, an administrator updating an existing security policy for an application or detecting a new user accessing a device.

FIG. 1 is a schematic diagram illustrating the hardware environment of a mobile information management system embodying aspects of the invention. Communications between client 100 and server 110 may take place over any combination of one or more electronic communication networks 120, including local area networks (LAN) and/or wide area networks (WAN). The network 120 may use various communication protocols, including wireless networking protocols (e.g., WiFi), wired networking protocols (e.g., Ethernet), radio networking protocols (e.g., GSM, LTE), etc., and can be arranged in any configuration (e.g., point-to-point, broadcast, etc.). Such communications may utilize encryption, private networks, virtual private networks, and/or various other networking protocols and technologies.

According to FIG. 1, the MIM system implements a client-server model where one or more clients 100 connect to one or more servers 110 hosting a MIM system via a network 120. In some embodiments, client hardware 100 may correspond to a mobile device. In other embodiments, client hardware 100 may correspond to any computing device, such as a desktop computer or a laptop. In various embodiments, server 110 may comprise one or more physical and/or virtual machines (i.e., different physical machines, different virtual machines, and/or the same physical or virtual machines).

Each of clients 100 may include respective software for interacting with the MIM system hosted on server 110 via a network 120. In various embodiments, the respective software may include web browsers, browser plugins (e.g., "widgets"), and/or stand-alone applications. The software on client 100 may be configured to access one or more interfaces (e.g., user or programmatic interfaces) exposed by the MIM system hosted on server 110 for managing an application environment.

In some embodiments, server 110 may include a mobile application distribution platform that is configured to distribute or maintain mobile applications for various operating system ("OS") segments, including, for example, Android, iOS, Blackberry, and Windows. As shown in FIG. 1, the sever 110 may include both an MIM system that manages mobile device 100 security at the application level and a mobile application distribution platform. In various embodiments, separate servers 110 may be used for mobile application distribution and mobile security. For example, one organization may control a sever 110 with a mobile application distribution platform, while the same, or a different organization, may control the same or a separate server 110 that includes a MIM system.

Figure 2:
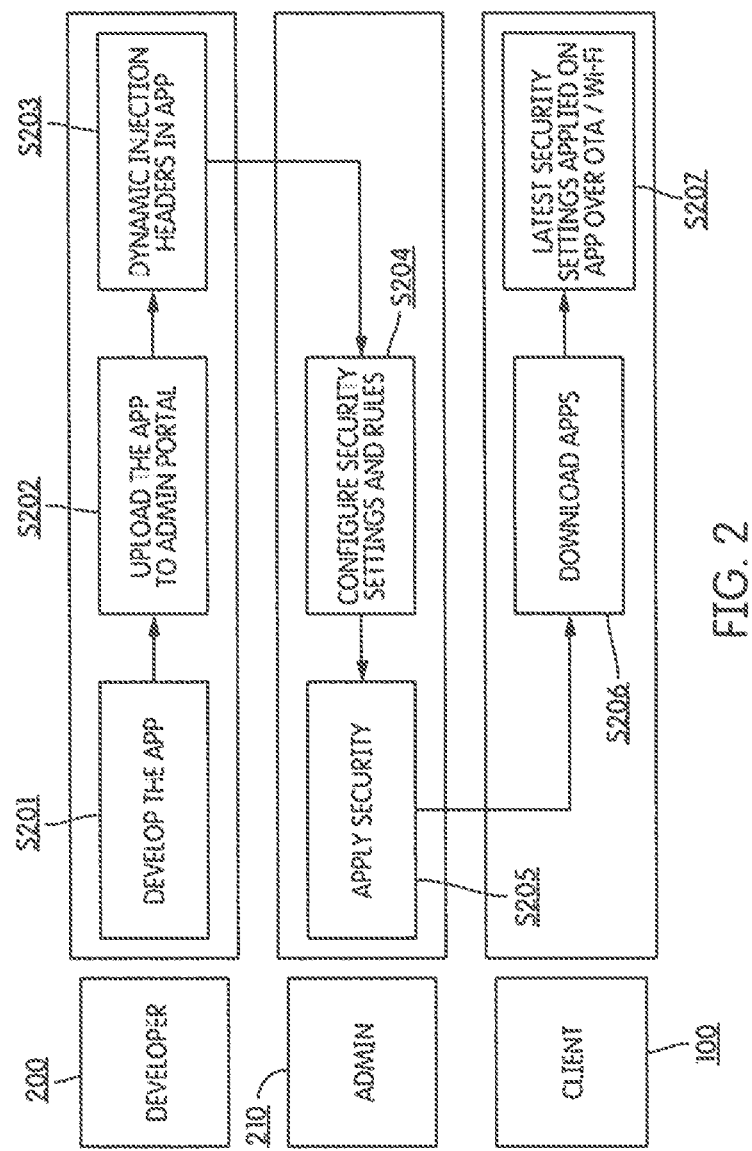
FIG. 2 is a flow diagram illustrating a mobile information management method embodying aspects of the invention.

FIG. 2 is a flow diagram illustrating a mobile information management method embodying aspects of the invention.

The mobile information management method of FIG. 2 may be implemented by a MIM provider using, for example, a single server 110 containing a MIM system integrated with a mobile application distribution platform, as described in further detail below. In other embodiments, the method of FIG. 2 is implemented on a single server 110 hosting a MIM system in, addition to a separate second server 110 containing an application distribution platform.

The method begins at S201 where an application developer 200 develops an application. In exemplary embodiments, the application corresponds to a software application designed to execute on a client 100. In some embodiments, the client 100 may be any computing device, such as a mobile device, computer, or laptop. The developer 200 may develop the application in any desired computing environment, or optionally on a server 110 that includes a mobile application distribution platform and/or a MIM system. A mobile application distribution platform may distribute and/or maintain native, hybrid, HTML5, etc., mobile applications for various mobile operating segments (Android, iOS, Blackberry, Windows, etc.) and/or mobile and desktop browsers.

According to various embodiments, a MIM system is configured, for example, to wrap security policies around an application, and/or manage and implement security policies at run time, on a mobile device. The MIM system may be implemented in conjunction with a mobile application distribution platform on a shared server 110, or encompass a standalone system on a server 110 that optionally integrates with one or more third party mobile application distribution platforms on separate servers 110. Such mobile application distribution platforms may encompass any middleware, appstore, or platform associated with the distribution of mobile applications. Additionally, in some embodiments, the MIM system may be integrated with other MDM and security solutions. The integration of a MIM system with a mobile application distribution platform, according to some embodiments, is described in further detail below with reference to FIG. 3.

In some embodiments, the developed application of step S201 may be uploaded to a backend application security console of a MIM system in step S202, described in further detail below. In exemplary embodiments, dynamic headers corresponding to MIM policies are injected into developed applications in step S203 via a code injection approach. In some embodiments, the injected headers of step S203 correspond to one or more manifest files injected into an application at build-time that control the behavior elements of an application. At run time, when an application launches on a mobile device, the injected files of step S203 may optionally download a stream of behavior, transaction, and/or security instructions according to various MIM policies from a MIM system hosted on a server 110.

In step S204, security settings and rules are configured according to various MIM policies. In some embodiments, the MIM policies may be mobile device security policies that are configured by an administrator 210. Such security policies may correspond to use cases and/or the native APIs of a device, such as for storage, global positioning, camera, etc. In some embodiments, the policies may correspond to a security action designed, for example, to control any external hardware components, such as hyberdriver, and external camera, etc., that are attached to the mobile device. In exemplary embodiments, security settings dynamically control the behavior of an application and/or mobile device at run time via a security action.

One type of security policy may provide geographic fencing, and provide security actions based on a mobile application's geographic location. For example, a geo-fencing security policy may require that the camera on a cell-phone be blocked when the mobile device enters a specific geographic area, such as a confidential work area. Consequently, in some embodiments, a MIM security policy may be dynamic, and affect an application's behavior at run time. Dynamic run time MIM policies, according to some embodiments, are described in further detail below with reference to FIG. 6.

In other embodiments, MIM security policies may not be affected at run time. For example, a MIM policy may relate to data security on a mobile device. For example, to secure data in a mobile device, an injected security layer may act as a data filtering layer, and certain data may be secured and stored in encrypted, application-specific, data containers. Such a data filtering layer may implement security actions that govern the incoming and outgoing data calls to the encrypted data container in order to apply certain MIM security policies.

According to some embodiments, in step 205, an administrator 210 may apply the configured security settings and rules, or policies, of step S204 to an application. Additionally, an administrator 210 may change, update, monitor, and/or designate user and/or group security policies in an admin portal of a MIM system, described in further detail below.

In step 206, an application with the injected MIM code of step S203 may be downloaded by a mobile device 100. The mobile device 100 may download the application from a mobile application distribution platform hosted on a server 110, which is optionally integrated with a MIM system.

In step 207, the latest security settings may be applied to the application that was downloaded to a user's mobile device in step S206. The security settings may be dynamic at run time, and be applied to the application over the air, such as through a wi-fi connection, or through any network connection as described above for network 120 in FIG. 1.

Figure 3:
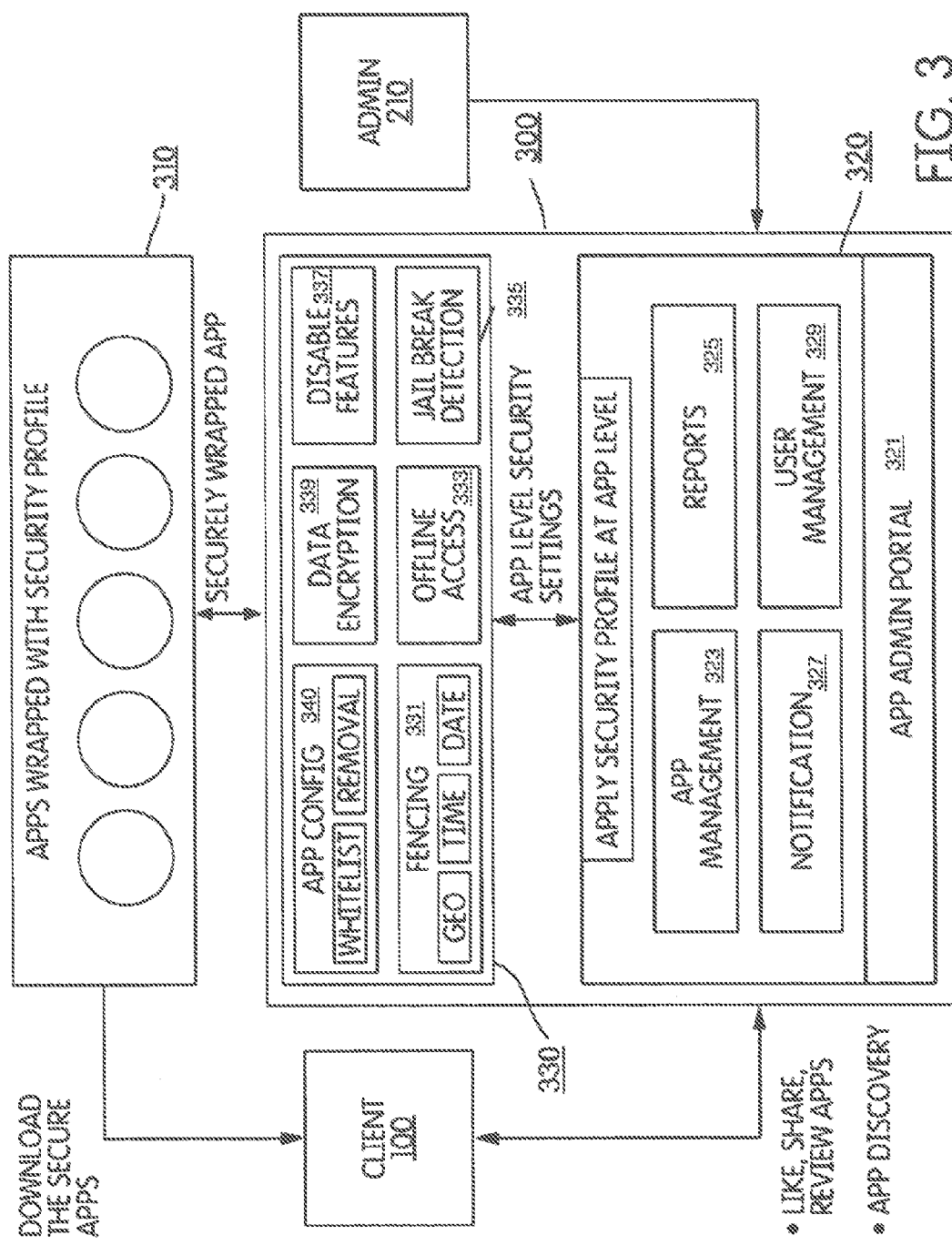
FIG. 3 is a block diagram illustrating the logical components of a mobile information management system integrated with a mobile application distribution platform embodying aspects of the invention.

FIG. 3 is a block diagram illustrating the logical components of a mobile information management system integrated with a mobile application distribution platform embodying aspects of the invention. In exemplary embodiments, MIM system 300 is configured to apply a security policy at an application level to a mobile device, or any other computing device. MIM system 300 may include a front end governance console 320 configured to, for example, allow an administrator 210 to create and modify security policies associated with an application and designate users and/or groups for which a security policy is to be applied. Additionally, MIM system 300 may include a back end application security module 330 configured to, for example, automatically wrap applications with a security policy via a code injection approach and/or implement new security policies or changes.

In some embodiments, the logical components of a MIM system 300 and mobile application distribution platform 310 may be implemented as software executing on one or more corresponding hardware servers. For example, the MIM system 300 may execute in conjunction with a mobile application distribution platform 310 on a server 110, or the MIM system 300 may execute on a server 110 and a mobile application distribution platform 310 may execute on a separate, different, server 110. In particular, governance console 320 and application security console 330 may execute on a single server 110 as part of a MIM system. MIM system 300 may also contain one or more databases or data stores that are accessed by governance console 320 and/or application security console 330.

In some embodiments, the MIM system 300 includes a governance console 320 configured to display an admin portal 321 graphical user interface (e.g., administrator portal in a browser), with which an administrator 210 may set one or more of the MIM policies defined or stored in a policy database by backend application security console 330. Admin portal 321 may correspond to any software configured to allow an administrator 210 to interact with governance console 320, e.g., through a graphical user interface. For example, admin portal 321 may be a special-purpose stand-alone application configured to invoke network services and/or other network interfaces exposed by governance console 320 in MIM system 300. In other embodiments, governance console 320 may include a general-purpose application, such as a web browser, configured to display an admin portal 321.

In exemplary embodiments, the admin portal 321 provides a graphical user interface that allows an administrator 210 to control various MIM governance activities, such as application management and security management. For example, an administrator 210 may be able to manage one or more applications subject to MIM governance through an application management tool 323. In some embodiments, the application management tool 323 may be used by an administrator 210 to, for example, upload applications to the MIM system 300, upgrade applications, and/or make modifications to applications. Applications, upgrades, and/or modifications to applications may be stored in an application database. Additionally, application management tool 323 may be used to assign access rights to end users of the application.

In exemplary embodiments, application management tool 323 allows an administrator 210 to specify security policies for the application as well as specify which policies will be applied for which end users and/or groups. Accordingly, in some embodiments, one or more security policies may be assigned to one or more specified end users and/or groups at an application level. Such security policy assignments may be stored in, for example, a configuration database.

In some embodiments, an administrator 210 may be able to generate reports of applications and/or user data through a reporting tool 325. The reports generated by reporting tool 325 may include, for example, usage based reporting around an application, resource download statistics, and user behavior characteristics, such as comments and other feedback. In some embodiments, an administrator 210 may be able to pull and/or push notifications from/to a client 100 concerning an application or user with notification tool 327.

In exemplary embodiments, an administrator 210 may be able to manage users, or define groups, for which various MIM policies apply via a user management tool 329. In some embodiments, MIM system 300 includes a user database. The management tool 329 may, for example, allow an administrator 210 to register/add new users to the user database in MIM system 300, and/or remove users from the user database.

In exemplary embodiments, MIM system 300 includes a backend application security console 330. An administrator 210 may access the application security console 330, for example, through a graphical user interface provided by an application admin portal 321 in governance console 320, in order to specify security settings and/or profiles to be wrapped around an application. The application security console 330 may contain one or more security modules that can be used to define an application-specific security profile. In some embodiments, the security modules may include a data encryption module 339, a disable features module 337, a jail break detection module 335, an offline-access restriction module 333, etc., to implement one or more security policies. Additionally, in some embodiments, various mobile fencing modules 331 may be included in application security console 330 that provide for geographic, time, date, etc., based restrictions to an application.

In some embodiments, application security console 330 provides an application configuration module 340 that may associate one or more security profiles and modules with an application. For example, an application configuration module 340 may be used to inject manifests, or other code, corresponding to various security modules into an application via the injection process and/or wrap a security profile around an application. Additionally, application configuration module 340 may contain a whitelist, or register, of applications for which a security policy is to be applied, and a removal list of applications for which security policies are to be removed. An administrator may adjust or update the configuration module 340, via admin portal 321 of governance console 320, based on changes to security policies. The configuration data may be stored in a configuration database.

In some embodiments, code injection of various MIM security policies may be implemented automatically via application security console 330 based on security policies designated by an administrator 210 in governance console 320 of MIM system 300.

In accordance with the illustrated embodiment, MIM system 300 may be integrated with an application distribution platform 310. Applications may be automatically downloaded from application distribution platform 310 to application security console 330 to be wrapped with a security policy. The applications wrapped with security policies may be uploaded to application distribution platform 310. Once security wrapped applications are uploaded to application distribution platform 310, they may be downloaded by a user at client 100.

In other embodiments, an application distribution platform 310 may run as a separate system or virtual machine on one server 110, and the governance and application security consoles, 320 and 330, may run on one or more different servers. In some embodiments, governance console 320 and application security console 330 may run as separate virtual machines on one or more servers 110. In such embodiments, the various components may interact over a communications network 120.

In exemplary embodiments, a compiled application is wrapped with a security policy or profile through a code injection process implemented by application security console 330. The injection process may be implemented as computer readable program code executing as a script in application security console 330 in MIM system 300. In some embodiments, the injected code is used to implement security policies associated with the application on a mobile device, and the policies may be managed in governance console 320 by an administrator 210 using a graphical user interface provided by admin portal 321. For example, the administrator 210 may access a management tool 323 in governance console 320 of a MIM system 300 via an admin portal 321.

Figure 4:
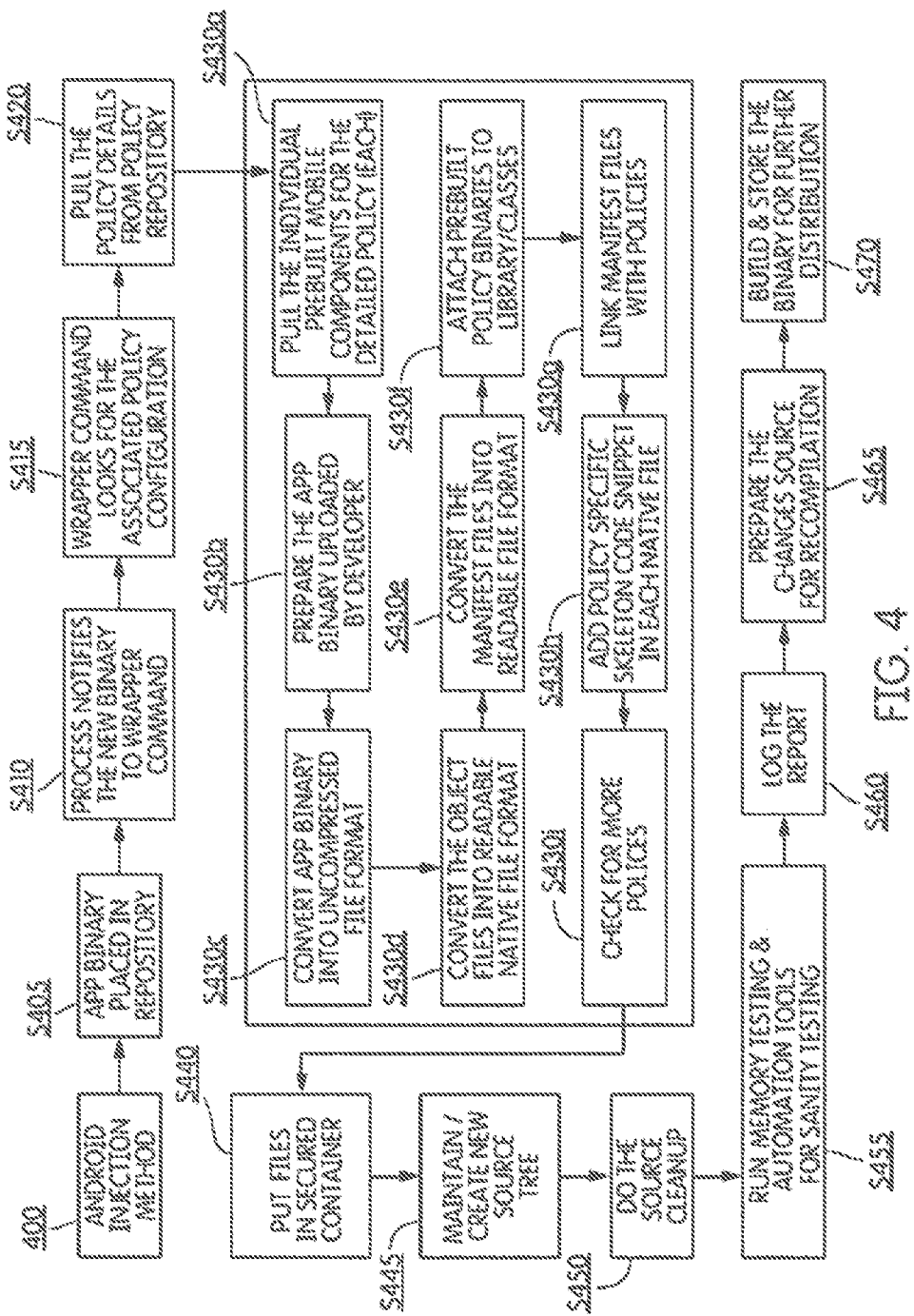
FIG. 4 is a flow diagram illustrating an Android injection method embodying aspects of the invention.
Figure 5:
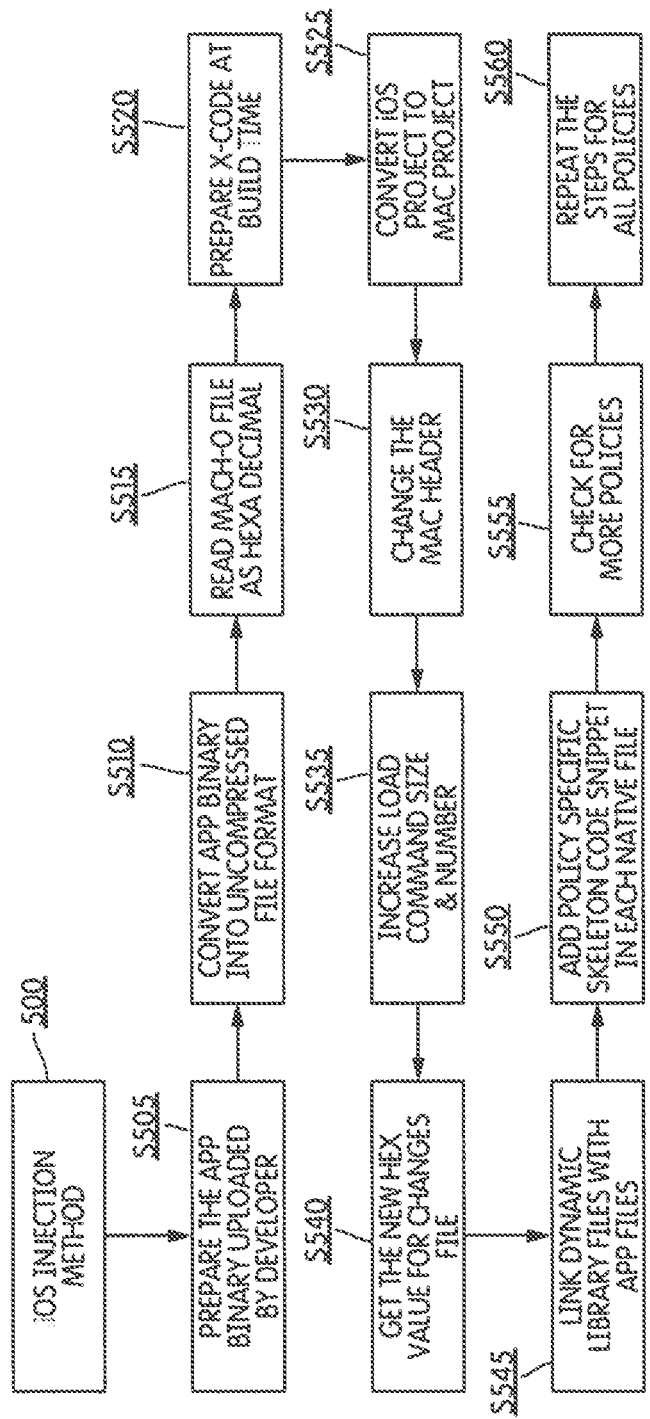
FIG. 5 is a flow diagram illustrating an iOS injection method embodying aspects of the invention.

In some embodiments, the injection process is accomplished using an automatic script executed on application security console 330 without any user interaction. To begin the injection process, a compiled source code of an application is unwrapped. Once the injection script detects the unwrapped file, a series of steps is performed to wrap security policies around the compiled source code of the application. FIGS. 4 and 5, described below, illustrate two specific embodiments of an automatic code injection script to wrap a security policy around an application for Android and iOS environments, respectively.

A person of skill in the art can appreciate that the injection process may be used in other operating environments. For example, in exemplary embodiments, the code injection process utilizes skeleton components, which are prebuilt libraries specific to a mobile operating system. A policy specific skeleton code snippet may correspond to a small subset of the skeleton libraries (binaries) that are distributed along with the application binaries. In the code injection process, the skeleton code may be directly linked with one or more security policies configured in an application security console 330 of MIM system 300, and policy-specific skeleton code snippets may be injected in the native files of an application.

Accordingly, in exemplary embodiments, the injected skeleton code snippet may be used to execute a complete security policy in an application at run time. For example, the following pseudocode may be executed in the application at run time:

Pseudocode at runtime:

```
FOR CONFIGURED POLICES
  EACH POLICY / USER
  IF POLICY ENABLED
    LOAD POLICY SPECIFIC OS CODE
    READ DEVICE STATE
    CONNECT POLICY SERVER
    DOWNLOAD COMPLETE BUSINESS LOGIC
    EXECUTE POLICY
  ITERATE NEXT POLICY
```

The application's behavior at run time, embodying aspects of the invention, is described in further detail below with reference to FIG. 6.

FIG. 4 is a flow diagram illustrating an Android injection method, according to some embodiments. Android injection method 400 begins when an application's binary code is placed in a repository in step S405. In step S410, a process notifies a new binary to wrapper command, and in step S415 the wrapper command looks for an associated policy configuration for the application. In step S420, the policy details associated with the application are pulled from a policy repository, such as application security module 330.

Steps S430*a*-S430*e* correspond generally to extracting the application's compiled source (binaries) from the executable by unzipping the executable. In some embodiments, the executable may be unzipped using native tools and/or libraries, which may be proprietary. In Step 430*a*, each individual prebuilt mobile component for the detailed policy is pulled, such as, e.g., security modules 331, 333, 335, 337, and 339 described above. These mobile components include the code to be injected with the application in order to implement one or more MIM security policy. In Step 430*b*, the application binary is prepared, and in step S430*c*, the application binary is converted into an uncompressed file format. In step S430*d*, the object files of the application are converted into their readable native file format. In step S430*e*, the application manifest files are converted to a readable native file format. In steps S430*f*-S430*h*, the additional source and resource files corresponding to a MIM security policy are added to respective folders of the application tree. In step S430*f*, the prebuilt policy binaries, pulled in step S430*a*, are attached to the application's library and classes. In step S430*g*, the manifest files of the application are linked with the policies.

In step S430*h*, a policy specific skeleton code snippet is added to the native files of the application. In step 430*i*, it is determined whether there are any additional policies to apply, and steps S430*a*-S430*i* are repeated until there are no more policies to inject.

In some embodiments, Android root validation features may be used to implement security policies. For example, a root checker skeleton code snippet in Android may include the following:

```
File file = new File("/system/app/Superuser.apk");
    if (file.exists( )) {
        return true;
    }
    if (new ExecShell( ).executeCommand(SHELL_CMD.check_su_binary) != null) {
        return true;
    }
```

The manifest files are put in a secured container with the application in step S440. In some embodiments, virtual machines of a MIM system 300, running on application security console 330, may be associated with an application in order to monitor and control the behavior of the application at runtime. The virtual machines in security console 330 of a MIM system 300 may be associated with an application by injecting corresponding kernel-based instructions into a manifest file, which is placed into a secured container with the application in step S440. In some embodiments, the manifest instructions may be in native format using, for example, an Android NDK toolset, and/or may be kernel-based depending on the MIM policy associated with the application.

In step S445, a new source tree may be maintained or created. The source tree may link the newly added components from steps S430*a*-S430*i* with the application executable. In step S450, a source cleanup is performed. In step S455, sanity testing is performed, and the report from the sanity testing is logged in step S460. Sanity testing may be used to check the application behavior and ensure that the wrapped application is not breaking at run time. In some embodiments, sanity testing is handled as part of the development cycle of an application and/or security policy implementation. Sanity testing may be performed manually, but in exemplary embodiments, sanity testing is performed automatically for wrapped applications in step S455. In step S465, the injected application is prepared and bundled for recompilation/build. In step S470, the binary of the security wrapped application is built and stored for further distribution.

FIG. 5 is a flow diagram illustrating an iOS injection method, according to some embodiments. The iOS injection method 500 is very similar to the Android injection method 400, with a few modifications. To begin, in step S505 the application binary uploaded by a developer is prepared. In step S510, the application binary is converted into an uncompressed file format.

In the iOS injection method 500, the MIM policy needs to be injected into a compiled application bundle (ipa). The code prepared by the developer cannot be changed, so an extra library (.dylib) is added to the unzipped ipa (.app) file. The added library is linked with the object file (Mach-O) inside the .app. Accordingly, at step S515 the Mach-O file is read as a hexa decimal. In step S520, the X-code is prepared at build time. In step S525, the iOS project is converted to a MAC project. In step S530, the MAC header is changed. In step S535, the load command size and number is increased. In step S540, the new hex value for the file changes file is obtained.

The extra library (.dylib) is linked with the application files in step S545. Any other necessary files, such as .png, .nib, etc. are copied into the .app folder, as there is no need to link these files with the object file of the application. In step S550, the MIM security policy specific skeleton code snippet is added to each native file. In step S555, it is checked to see if there are more policies to be added. If there are more policies to be added, in step S560 method 500 is repeated for all policies. Once one or more policies are packed in to the application bundle, the bundle is code signed with an enterprise distribution certificate. After code signing, the .app is archived into an .ipa, and published to a mobile application distribution platform.

In exemplary embodiments, the MIM system 300 can support security policies in two ways.

First, existing policies may be updated and wrapped in an application to accommodate new security rules. In some embodiments, a pre-compiled security policy is represented as a reusable library, is broken into smaller instructions, and the entire library and/or smaller instructions is maintained in application security console 330. An admin can create new rules associated with the existing policy using the governance console 320. The existing policy may be represented as one or more plain-English rules in a graphical user interface displayed via admin portal 321, which allows an admin to select and/or modify the policy. The updated policy may be converted to system files, such as Java stubs and skeletons, and is stored and maintained in application security console 330. The stubs and/or skeleton snippets may eventually be loaded into an application at build time, along with the wrapped files.

Second, lightweight components corresponding to security policies may be loaded on a demand-basis at run time. A lightweight solution may be desirable where a policy has a big foot print. For example, a geo-location based policy may require many components, such as latitude and longitude details, geo-fencing logics, behavior and hardware controls, etc. This geo-location policy can be supported as described above by loading all of the components at build-time as wrapped binary, via the injection process. However, the large foot print of the policy may be undesirable in low bandwidth scenarios. Accordingly, in some embodiments, a policy can be partially loaded as smaller components. For example, the additional components of the geo-location based policy may be downloaded to a mobile device at run time, thereby providing light application distribution.

Figure 6:
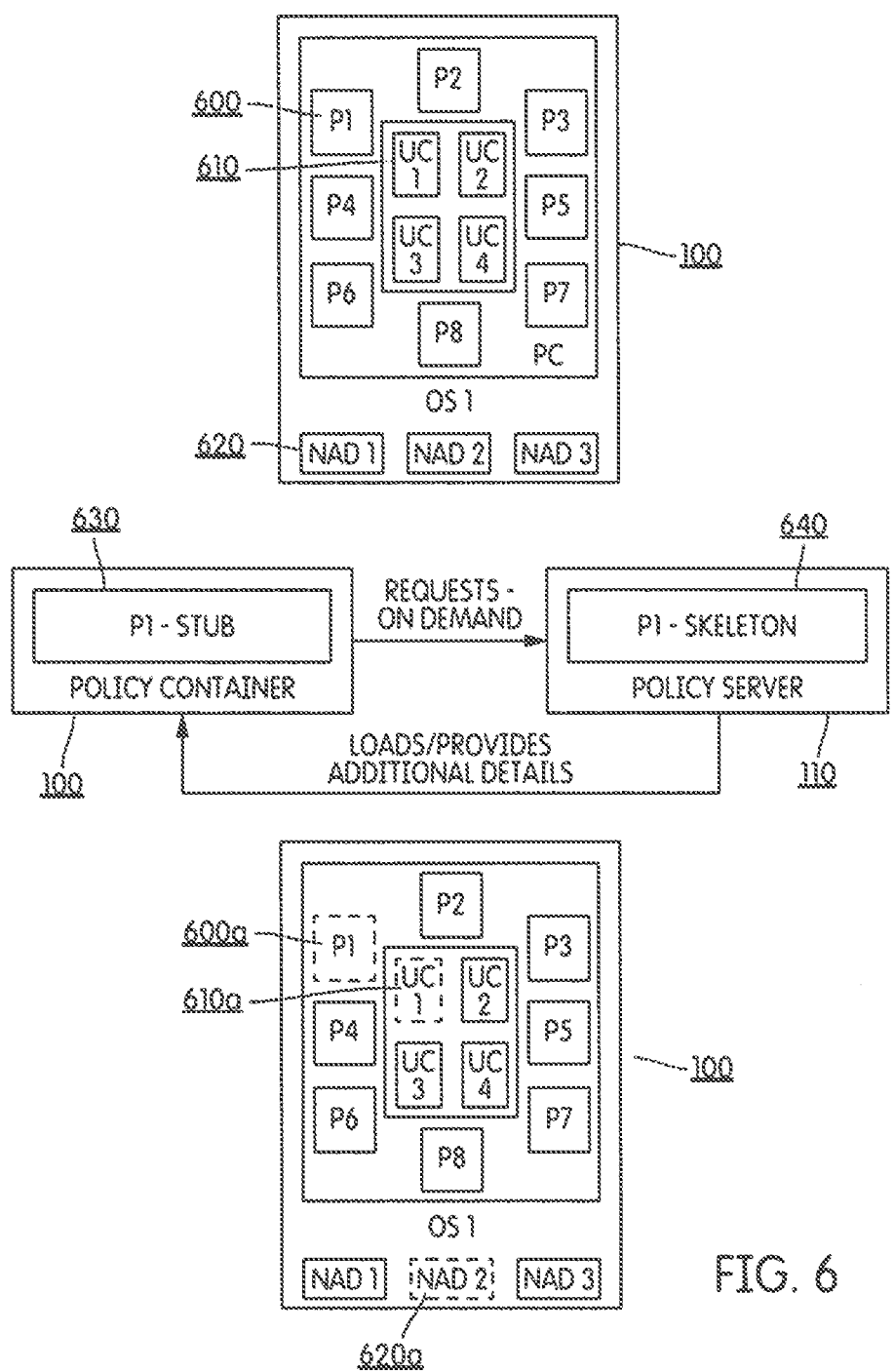
FIG. 6 is a block diagram illustrating the logical components of a mobile device at runtime under mobile application management embodying aspects of the invention.

FIG. 6 is a block diagram illustrating the logical components of a mobile device at runtime under mobile information management, according to some embodiments. Mobile device 100 contains stub policies (P1 . . . P8) 600. Stub policies are the security parameters included in a security profile. In some instances, a default profile with prefixed security parameters may be associated with an application. For example, a prefixed security parameter may include an idle timeout set for 10 minutes, offline access enabled for 15 minutes, etc. The stub policies 600 are wrapped with an application via the code injection process describe above, and provide for a dynamic build process. They are lightweight components, and may be loaded at runtime or build time based on the nature of the policy.

The security policies 600 may control use cases (UC 1 . . . UC4) 610 and/or the native APIs (NAD 1 . . . NAD 3) 620 of client 100. The native APIs 620 may relate to, for example, the storage, GPS, and camera functionalities of a mobile device 100. The security policies 600 may also control any external hardware devices, like a hyberdriver, external camera, etc., that is attached to mobile device 100. For example, in one embodiment, a geo-fencing policy to control the GPS functionality of a mobile device 100 will be prebuilt along with an application binary in the injection process.

At runtime, based on a stub policy 630 injected into the application, the mobile device 100 will send a request to MIM system 300, which may be hosted on a server 110. In exemplary embodiments, the stub policy 630 corresponds to a skeleton policy of a security module in an application security console 330 of a MIM system 300. Based on skeleton policy 640, the application security console 330 of MIM system 300, hosted on policy server 110, will load and/or provide additional details regarding the policy to client device 100. Consequently, at runtime, the policies will be fully active based on the data obtained from the application security console 330. Specifically, at runtime, use case one ("UC1") 610a, associated with the fully active policy one ("P1") 600a, will control native hardware elements and/or behaviors of native API two ("NAD2") 620a with a security action.

For example, a policy for a claim surveyor application may specify that a supervisor may take photos from the application, whereas the adjustor cannot. In this example, two use cases may include 1) a supervisor taking photos from the claim surveyor application, and 2) an adjustor taking photos from the claim surveyor application. According to the use cases, the behavior of the native API may change according to a security action designated by the policy. For example, if an adjustor tries to take a photo from the claim surveyor application (e.g., "UC1"), the application will respond with a security action to block the photo feature within the application (e.g., "NAD2") according to the policy (e.g., "P1").

In some embodiments, an admin may change and manage the skeleton code 640 and/or data structures and/or security modules in application security console 330 using governance console 320 of MIM system 300. Additionally, in exemplary embodiments, the admin can cause MIM system 300 to push a modified or new policy to a client 100 through a push notification implemented by application security console 330.

In exemplary embodiments, based on various user profiles, groups, or roles, different manifest instructions may be applied at run time on a mobile device 100. Policies based on user profiles, groups, and roles may be desirable because many companies have different organizational hierarchies, and an employee at a certain point in the hierarchy may have different access rights for enterprise applications. Existing MDM/MAM models do not provide for group-based policies, and only allow security policies to be defined universally at an application-based level. However, according to some embodiments, an application's behavior may change based on a group policy and/or user profile. As a result, multiple users, associated with different policies, can use the same device.

Additionally, prior art MDM systems require that a user must change the virtual private network ("VPN") settings in the settings screen of a mobile device. However, it may be improper to assume that the user will always access the corporate application, which may be subject to security policies. For example, users will often switch to other applications or games, particularly in a situation where the user is waiting for a download to finish for a corporate application. Consequently, if the VPN is configured at the device level, it may restrict a user's access to applications by blocking some network domains.

To overcome the above limitations, in some embodiments, a MIM system 300 may provide for application specific virtual private networks. Such application specific VPNs will manage the application's network, for example, through inbuilt VPN configuration certificates. Additionally, in other embodiments, the MIM system 300 may support an application single sign-on with shared certificates.

Figure 7:
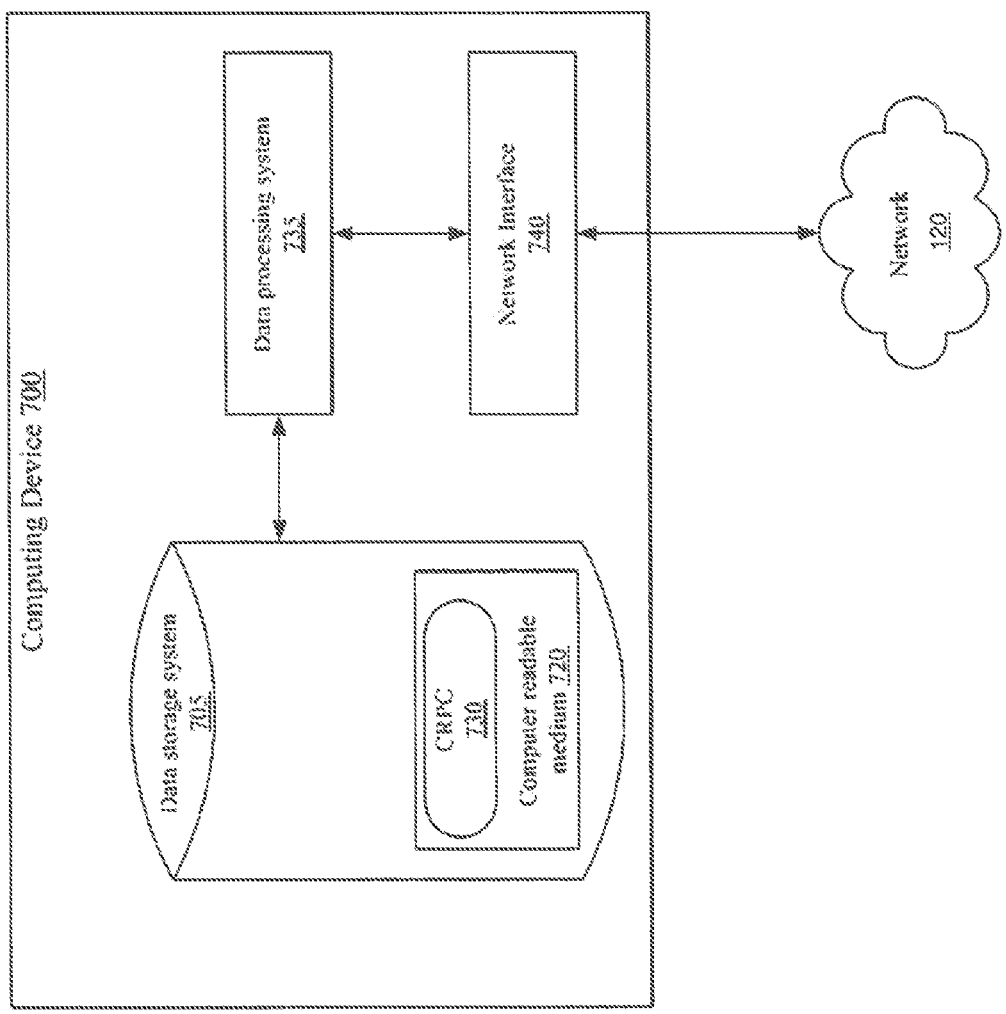
FIG. 7 illustrates a possible implementation for at least some components of a physical computing device embodying aspects of the invention.

FIG. 7 illustrates a possible implementation for at least some components of a physical computing device, according to some embodiments. In some embodiments, computing device 700 may correspond to any physical computing device, such as mobile device 100 or server 110. In some embodiments, the physical components illustrated in FIG. 7 may be simulated by virtual components of a virtual machine.

As shown in FIG. 7, computing device 700 may include a data processing system 735. In some embodiments, data processing system 735 may include any number of processors, any number of which may include one or more processing cores. In some embodiments, any of the processing cores may be physical or logical. For example, a single core may be used to implement multiple logical cores using symmetric multi-threading.

Computing device 700 also includes network interface 740 for receiving input and for transmitting messages over network 120. In some embodiments, MIM system 300 may be hosted on a server 110 that includes a network interface configured to, for example, receive and/or transmit messages, or other input, from an administrator and/or mobile device over a network 120. Additionally, a mobile device, or client device 100, may include a network interface configured to receive, for example, applications and security instructions from a server 110 hosting a MIM system 300 and/or application distribution platform 310.

Computing device 700 also includes a data storage system 705, which may include one or more computer-readable mediums. The computer-readable mediums may include any number of persistent storage devices (e.g., magnetic disk drives, solid state storage, etc.) and/or transient memory devices (e.g., Random Access Memory). In some embodiments, the data storage system 705 of computing device 700 may also include one or more data stores or data bases to manage and store, for example, various MIM security policies, application files, security modules, users, configuration data, etc.

In embodiments where data processing system 735 includes a microprocessor, a MIM system 300 or any subcomponents may be provided as a computer program product. Such a computer program product may include computer readable program code 730, which implements a computer program, stored on a computer readable medium 720. Computer readable medium 720 may include magnetic media (e.g., a hard disk), optical media (e.g., a DVD), memory devices (e.g., random access memory), etc. For example, various subcomponents of MIM system 300 may be implemented as computer readable program code, such governance console 320 and application security console 330.

In some embodiments, computer readable program code 730 is configured such that, when executed by data processing system 735, code 730 causes the processing system to perform steps described above. For example, the steps of the injection process and/or the MIM method may be implemented as computer readable program code 730 executed by a data processing system 735 of MIM system 300.

In other embodiments, computing device 700 may be configured to perform steps described above without the need for code 730. For example, data processing system 735 may consist merely of specialized hardware, such as one or more application-specific integrated circuits (ASICs). Hence, the features of the present invention described above may be implemented in hardware and/or software. For example, in some embodiments, the functional components described above may be implemented by data processing system 735 executing computer instructions 730, by data processing system 735 operating independent of any computer instructions 730, or by any suitable combination of hardware and/or software. Such functional components may include, for example, MIM system 300, governance console 320, and application security console 330.

While the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Additionally, while various embodiments and implementations of the present invention have been described above, it should be understood that they have been presented by way of example only, and not limitation. Thus, the breadth and scope of the present invention should not be limited by any of the above-described exemplary embodiments.

The invention claimed is:

1. An application information management security system comprising:
    a governance console configured to store one or more security policies, wherein each security policy:
        corresponds to one or more applications intended for one or more computing devices, and
        indicates one or more potential use cases and one or more corresponding security actions;
    a security console configured to:
        receive, by a computer, compiled applications;
        automatically wrap each of the received compiled applications with one or more security policies using a code injection script, wherein the code injection script comprises computer readable program code that causes the security console to inject one or more skeleton code snippets into at least one of a native file and a manifest file of the one or more received applications.

2. The application information management security system of claim 1 further comprising an application distribution console configured to distribute the one or more wrapped applications onto one or more computing devices.

3. The application information management security system of claim 2, wherein at run time of one or more wrapped applications distributed to one or more computing devices by the application distribution console, the one or more wrapped distributed applications optionally download a stream of behavior, transaction, and/or security instructions from the security console.

4. The application information management security system of claim 1, wherein the governance console further comprises an admin portal user interface for setting, managing, monitoring, and viewing the one or more stored security policies corresponding to the one or more received applications.

5. The application information management security system of claim 1, wherein the code injection script comprises computer readable program code that causes the security console to inject one or more dynamic headers into the one or more received applications.

6. The application information management security system of claim 2, wherein the security console is further configured to detect relevant events from computing devices executing one or more of the compiled applications wrapped with the one or more security policies, wherein the events comprise one or more functionalities being employed on the computing device, location of the computing device, time of use of the device, and receipt of appropriate security credentials.

7. The application information management security system of claim 6, wherein the security console is further configured to compare the detected relevant event to the one or more stored security policies and take one or more appropriate actions if the relevant event matches a specified number of conditions specified by one or more of the stored security policies.

8. The application information management security system of claim 2, wherein the security console is further configured to update an existing security policy for one or more of the received applications and the application distribution console is configured to deploy the new security policy.

9. The application information management security system of claim 1, wherein the one or more security actions and/or potential use cases comprise one or more of the following: geographic fencing, data security, disable features, encryption, jail-break detection, time-based restriction, and date based restriction.

10. A method for information management of applications, the method comprising:
receiving, by a computer, one or more compiled applications;
receiving, by a computer, one or more security policies, wherein each security policy indicates one or more use cases and one or more security actions associated with each use case;
associating the received applications with the one or more received security policies; and,
automatically wrapping the received applications with the associated security policy using a code injection script, wherein the automatically wrapping step further comprises injecting one or more skeleton code snippets into at least one of a native file and a manifest file of the one or more received applications.

11. The method of claim 10 further comprising distributing one or more of the wrapped applications onto one or more computing devices.

12. The method of claim 11, further comprising transmitting a stream of behavior, transaction, and/or security instructions to the one or more computing devices executing the one or more distributed wrapped applications.

13. The method of claim 10, further comprising setting, managing, monitoring, and viewing the one or more received security policies and the one or more received applications associated with the received security policies.

14. The method of claim 10, wherein the automatically wrapping step further comprises injecting one or more dynamic headers into the one or more received applications.

15. The method of claim 11, further comprising detecting relevant events from the computing devices executing one or more of the distributed wrapped applications, wherein the events comprise one or more functionalities being employed on the computing device, location of the computing device, time of use of the device, and receipt of appropriate security credentials.

16. The method of claim 15, further comprising comparing the detected relevant event to the one or more stored security policies and taking one or more appropriate actions if the relevant event matches a specified number of conditions specified by one or more of the stored security policies.

17. The method of claim 11, further comprising updating an existing security policy for one or more of the distributed wrapped applications.

18. The method of claim 10, wherein the one or more security actions and/or potential use cases comprise one or more of the following: geographic fencing, data security, disable features, encryption, jail-break detection, time-based restriction, and date based restriction.

* * * * *